United States Patent
Mada et al.

(10) Patent No.: US 11,750,497 B2
(45) Date of Patent: Sep. 5, 2023

(54) BGP ROUTE AGGREGATION EXCEPTION SYSTEMS AND METHODS

(71) Applicant: Ciena Corporation, Hanover, MD (US)

(72) Inventors: Praveen Kumar Mada, Kanata (CA); Chaitanya varma Guntumadugu, Kanata (CA); Anurag Prakash, Ottawa (CA)

(73) Assignee: Ciena Corporation, Hanover, MD (US)

(*) Notice: Subject to any disclaimer, the term of this patent is extended or adjusted under 35 U.S.C. 154(b) by 161 days.

(21) Appl. No.: 17/148,760

(22) Filed: Jan. 14, 2021

(65) Prior Publication Data
US 2022/0224629 A1   Jul. 14, 2022

(51) Int. Cl.
| | |
|---|---|
| *H04L 12/28* | (2006.01) |
| *H04L 45/02* | (2022.01) |
| *H04L 45/28* | (2022.01) |
| *H04L 45/24* | (2022.01) |
| *H04L 45/122* | (2022.01) |
| *H04L 45/00* | (2022.01) |

(52) U.S. Cl.
CPC ............ *H04L 45/04* (2013.01); *H04L 45/122* (2013.01); *H04L 45/22* (2013.01); *H04L 45/245* (2013.01); *H04L 45/28* (2013.01)

(58) Field of Classification Search
CPC ....... H04L 45/04; H04L 45/122; H04L 45/22; H04L 45/245; H04L 45/28; H04L 45/46; H04L 45/247; H04L 41/0654
USPC ........................................................ 370/254
See application file for complete search history.

(56) References Cited

U.S. PATENT DOCUMENTS

| | | | |
|---|---|---|---|
| 8,666,247 | B2 | 3/2014 | Srinivasan et al. |
| 8,682,160 | B2 | 3/2014 | Prakash et al. |
| 8,718,471 | B2 | 5/2014 | Prakash et al. |
| 8,818,198 | B2 | 8/2014 | Trnkus et al. |
| 8,854,955 | B2 | 10/2014 | Prakash et al. |
| 9,054,831 | B2 | 6/2015 | Prakash et al. |
| 9,118,421 | B2 | 8/2015 | Swinkels et al. |
| 9,172,658 | B2 | 10/2015 | Kakkar et al. |
| 9,236,953 | B2 | 1/2016 | Chhillar et al. |
| 9,407,359 | B2 | 8/2016 | Swinkels et al. |
| 9,485,550 | B2 | 11/2016 | Chhillar et al. |
| 9,485,551 | B2 | 11/2016 | Prakash et al. |
| 9,628,172 | B2 | 4/2017 | Prakash et al. |
| 9,800,522 | B2 | 10/2017 | Chhillar et al. |
| 9,985,724 | B2 | 5/2018 | Prakash et al. |
| 10,003,867 | B2 | 6/2018 | Prakash et al. |
| 10,038,495 | B2 | 7/2018 | Prakash et al. |

(Continued)

FOREIGN PATENT DOCUMENTS

| | | |
|---|---|---|
| EP | 2 983 314 A1 | 2/2016 |
| EP | 3 051 725 B1 | 4/2020 |

*Primary Examiner* — Maharishi V Khirodhar
(74) *Attorney, Agent, or Firm* — Baratta Law PLLC; Lawrence A. Baratta, Jr.

(57) ABSTRACT

Systems and methods for a Border Gateway Protocol (BGP) route aggregation exception include advertising, to BGP peers, of a plurality of prefixes using BGP route aggregation or summarization; detecting a failure that is local to the router affecting a prefix of the plurality of prefixes; and advertising an aggregation exception that identifies the prefix to all of the BGP peers. The systems and methods can also include detecting recovery of the failure; and sending a withdrawal of the aggregation exception to all of the BGP peers.

20 Claims, 14 Drawing Sheets

(56) References Cited

U.S. PATENT DOCUMENTS

| | | | |
|---|---|---|---|
| 10,097,306 B1 | 10/2018 | Chhillar et al. | |
| 10,110,438 B2 | 10/2018 | Prakash et al. | |
| 10,158,448 B2 | 12/2018 | Prakash et al. | |
| 10,187,144 B2 | 1/2019 | Prakash et al. | |
| 10,187,152 B2 | 1/2019 | Prakash et al. | |
| 10,411,806 B2 | 9/2019 | Prakash et al. | |
| 10,455,300 B2 | 10/2019 | Swinkels et al. | |
| 10,536,216 B1 | 1/2020 | Chhillar et al. | |
| 2007/0091795 A1* | 4/2007 | Bonaventure | H04L 45/22 370/228 |
| 2019/0349262 A1 | 11/2019 | Miedema et al. | |
| 2019/0394701 A1* | 12/2019 | Nainar | H04L 45/48 |
| 2020/0313956 A1* | 10/2020 | Heitz | H04L 45/04 |
| 2022/0231906 A1* | 7/2022 | He | H04L 12/462 |

\* cited by examiner

BGP ROUTE AGGREGATION EXCEPTION SYSTEMS AND METHODS

FIELD OF THE DISCLOSURE

The present disclosure generally relates to networking. More particularly, the present disclosure relates to systems and methods for a Border Gateway Protocol (BGP) route aggregation exception.

BACKGROUND OF THE DISCLOSURE

Border Gateway Protocol (BGP) is a standardized exterior gateway protocol designed to exchange routing and reachability information among Autonomous Systems (AS) on the Internet. BGP Route summarization (aggregation) is a very powerful tool that can summarize the routes in routing protocol and advertise only summarized prefixes to achieve scale. BGP allows the aggregation of specific routes into a single summarized route with a "BGP aggregate-address" command. Disadvantageously, BGP route-summarization can cause traffic blackholing and sub-optimal routing in some scenarios of network failures. One of the workarounds to address the problem is to remove the BGP route aggregation, which forces the individual updates to be sent to BGP peers. Basically, forcing administrators to remove the route summarization to handle to failures, losing all advantages of summarization. Decommissioning the BGP aggregation feature will be take away the benefits it brings to scalability and network performance. This leads to too many routes in the data plane consuming the hardware entries, depleting the valuable network forwarding chip resources. This slows down the data path lookup for selecting the destination route, slows down best path selection due to too many routes in the BGP routing table, and increases control plane (BGP) route advertisements in the network, increasing the BGP convergence timing in the network.

BRIEF SUMMARY OF THE DISCLOSURE

The present disclosure relates to systems and methods for a Border Gateway Protocol (BGP) route aggregation exception. The present disclosure includes a novel BGP update that contains a new path attribute—"Aggregate Exception." This new path attribute helps in identifying a network failure and appropriately advertising to all BGP peers about the network failure through "Aggregate Exception" Network Layer Reachability Information (NLRI), which results in better path selection at the receiving BGP speakers (downstream routers). The present disclosure extends BGP NLRI updates to achieve resiliency in BGP network deployments, defines a new BGP path attribute (Aggregate-Exception) to be used in BGP updates, dynamically responds to network failures by advertising the Aggregate-Exception NLRI, dynamically withdraws the BGP update from other BGP peers upon the recovery of the network failures, and the like. The present disclosure allows addition and removal of the failed prefix with alternative next hop on the forwarding plane of the receiving BGP speaker. The present disclosure includes functionality at an aggregating BGP speaker and a receiving BGP speaker. Further, the present disclosure introduces a next-hop exclusion concept to the BGP routing protocol and provides an efficient approach to implement and deploy without compromising the benefits of route aggregation among BGP peers.

In an embodiment, a router includes a plurality of ports and switching circuitry configured to switch traffic between the plurality of ports; and circuitry configured to cause an advertisement, to Border Gateway Protocol (BGP) peers, of a first plurality of prefixes using BGP route aggregation or summarization, detect a failure that is local to the router affecting a prefix of the first plurality of prefixes, and cause an advertisement of an aggregation exception that identifies the prefix to all of the BGP peers. The circuitry can be further configured to detect recovery of the failure, and cause a withdrawal of the aggregation exception to all of the BGP peers. The circuitry can be further configured to receive an aggregation exception that identifies a second prefix that is part of a second plurality of prefixes that were advertised to the router using BGP aggregation, and find an alternate path for the second prefix and program a data plane accordingly. The circuitry can be further configured to receive a withdrawal of the aggregation exception for the second prefix, and delete the alternate path from a BGP routing table and from the data plane. The aggregation exception can be a path attribute in a BGP update message. The BGP can include one of internal BGP (iBGP) and external BGP (eBGP). The aggregation exception can be a route-advertisement of path-avoidance to a specific next-hop.

In additional embodiments, a method implemented by a router includes steps and a non-transitory computer-readable medium includes instructions that, when executed, cause one or more processors to perform the steps. The steps include advertising, to Border Gateway Protocol (BGP) peers, a first plurality of prefixes using BGP route aggregation or summarization; detecting a failure that is local to the router affecting a prefix of the first plurality of prefixes; and advertising an aggregation exception that identifies the prefix to all of the BGP peers. The steps can further include detecting recovery of the failure; and sending a withdrawal of the aggregation exception to all of the BGP peers. The steps can further include receiving an aggregation exception that identifies a second prefix that is part of a second plurality of prefixes that were advertised to the router using BGP aggregation; and finding an alternate path for the second prefix and programming a data plane accordingly. The steps can further include receiving a withdrawal of the aggregation exception for the second prefix; and deleting the alternate path from a BGP routing table and from the data plane. The aggregation exception can be a path attribute in a BGP update message. The BGP can include one of internal BGP (iBGP) and external BGP (eBGP). The aggregation exception can be a route-advertisement of path-avoidance to a specific next-hop.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
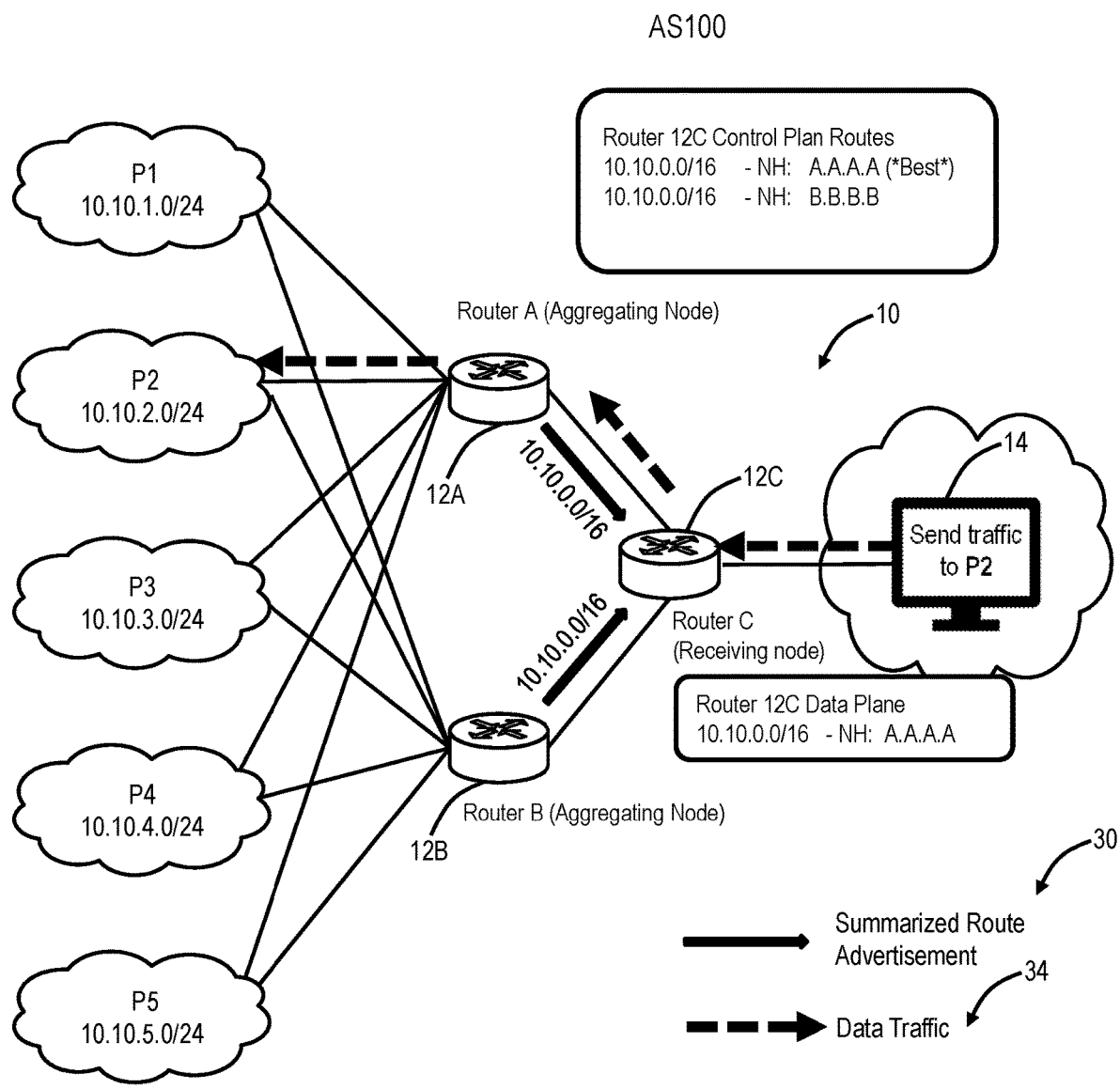
FIGS. 1 and 2 are network diagrams of a network illustrating internal BGP (iBGP) traffic blackholing.

Again, the present disclosure relates to systems and methods for a Border Gateway Protocol (BGP) route aggregation exception. The present disclosure includes a novel BGP update that contains a new path attribute—"Aggregate Exception." This new path attribute helps in identifying a network failure and appropriately advertising to all BGP peers about the network failure through "Aggregate Exception" Network Layer Reachability Information (NLRI), which results in better path selection at the receiving BGP speakers (downstream routers). The present disclosure extends BGP NLRI updates to achieve resiliency in BGP network deployments, defines a new BGP path attribute (Aggregate-Exception) to be used in BGP updates, dynamically responds to network failures by advertising the Aggregate-Exception NLRI, dynamically withdraws the BGP update from other BGP peers upon the recovery of the network failures, and the like. The present disclosure allows addition and removal of the failed prefix with alternative next hop on the forwarding plane of the receiving BGP speaker. The present disclosure includes functionality at an aggregating BGP speaker and a receiving BGP speaker. Further, the present disclosure introduces a next-hop exclusion concept to the BGP routing protocol and provides an efficient approach to implement and deploy without compromising the benefits of route aggregation among BGP peers.

The present disclosure mitigates traffic blackholing and sub-optimal routing arising out of BGP route summarization. As is known in the art, "traffic blackholing" is a reference to a place in the network where incoming or outgoing traffic is silently discarded (or "dropped") without informing the source that the data did not reach its intended recipient. With route summarization, BGP replaces a number of individual network advertisements with a single summarized advertisement and sends it to BGP peers. Unless all the individual networks go down, the aggregating node does not withdraw the summarized prefix from its peers. If one of the network's reachability is down, BGP peers will not be aware of the fact and continue to forward the traffic to the aggregating node where the traffic gets discarded. Note, the terms "route summarization" and "route aggregation" may be used interchangeably herein.

With the present disclosure, the aggregating node will have a mechanism to inform its BGP peers about the failed/unreachable networks due to link failures, temporary outages, etc. By knowing the aggregate exception route, BGP peers can look for an alternative next hop to forward the traffic. Upon the recovery of the failure, the aggregating node can withdraw the aggregate-exception BGP route it sent before. With this withdrawal, the receiving BGP peers will remove the aggregate-exception route from the control plane and data plane and fall back to the original summarized route to forward the traffic. By mitigating the problem arising out of route summarization in BGP, the solution helps to keep BGP route summarization in network deployments, improving network performance, scalability, etc. The present disclosure applies to both internal BGP (iBGP) and external BGP (eBGP).

BGP route summarization is a quite commonly used BGP feature to summarize specific prefixes into one summarized prefix with a shorter prefix-length. It is an effective way of enhancing the scalability requirements of iBGP and eBGP deployments. Some of the advantages are lowering the computation required by network elements by reducing the number of control plane (BGP) route advertisements in the network, conserving the hardware entries, and making the hardware lookup faster. On the flipside, BGP route summarization can cause sub-optimal routing and traffic blackholing in case of network failures, which is resolved herein.

iBGP Traffic Blackholing

Figure 2:
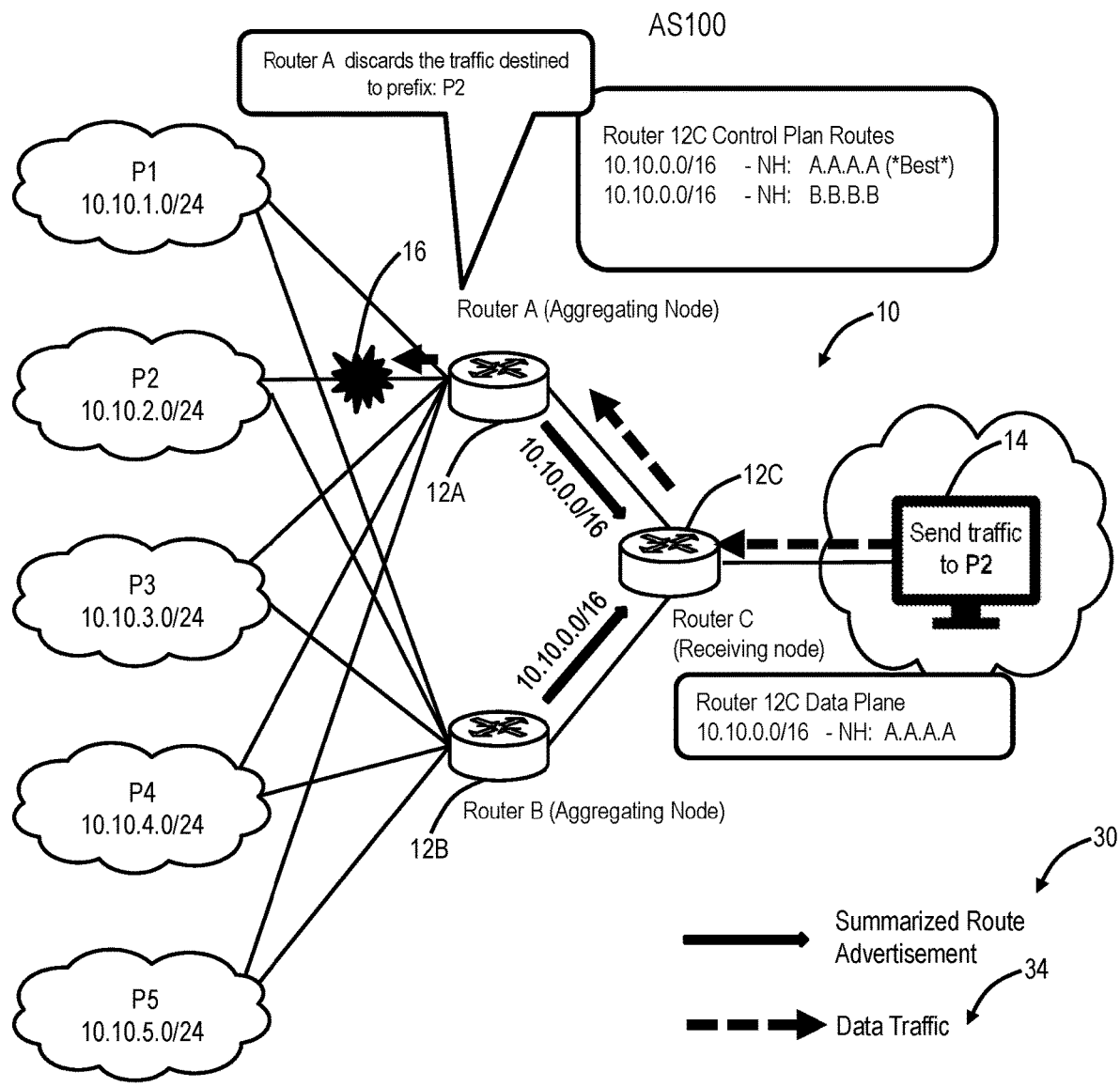

FIGS. 1 and 2 are network diagrams of a network 10 illustrating internal BGP (iBGP) traffic blackholing. In this example, the network 10 includes three routers 12A, 12B, 12C and five prefixes P1, P2, P3, P4, P5. The routers 12A, 12B are aggregating nodes and the router 12C is a receiving node (or speakers), and in this example, a device 14 is configured to send traffic to the prefix P2. The prefixes P1-P5 are each connected to each of the routers 12A, 12B and include common addresses of 10.10.X.X/24. BGP route aggregation is used here with all of prefixes aggregated in BGP. For example, both of the routers 12A, 12B provide a summarized route advertisement of 10.10.0.0/16 to the router 12C. In the control plane, all of the prefixes are advertised for a "best" next hop (NH) to the router 12A (address A.A.A.A) and next to the router 12B (address B.B.B.B). The device 14 send the traffic to prefix P2 to NH A.A.A.A based on the route aggregation. FIG. 1 illustrates an operational scenario with no failures. Also, for example, the network 10 is an Autonomous System (AS) with a label of AS 100.

FIG. 2 includes a fault 16 between the router 12A and the prefix P2. In this scenario with route aggregation, there is no new advertisement due to the fault 16. Rather, the traffic from the device 14 destined to the prefix P2 is discarded at the router 12A, causing traffic blackholing without any recovery, and bandwidth being wasted on the links. If the router 12A has a path to reach the router 12B, then the router 12A will forward to the router 12B causing a "sub-optimal routing path here," rather than the router 12C itself directly sending to the router 12B.

eBGP Traffic Blackholing

Figure 3:
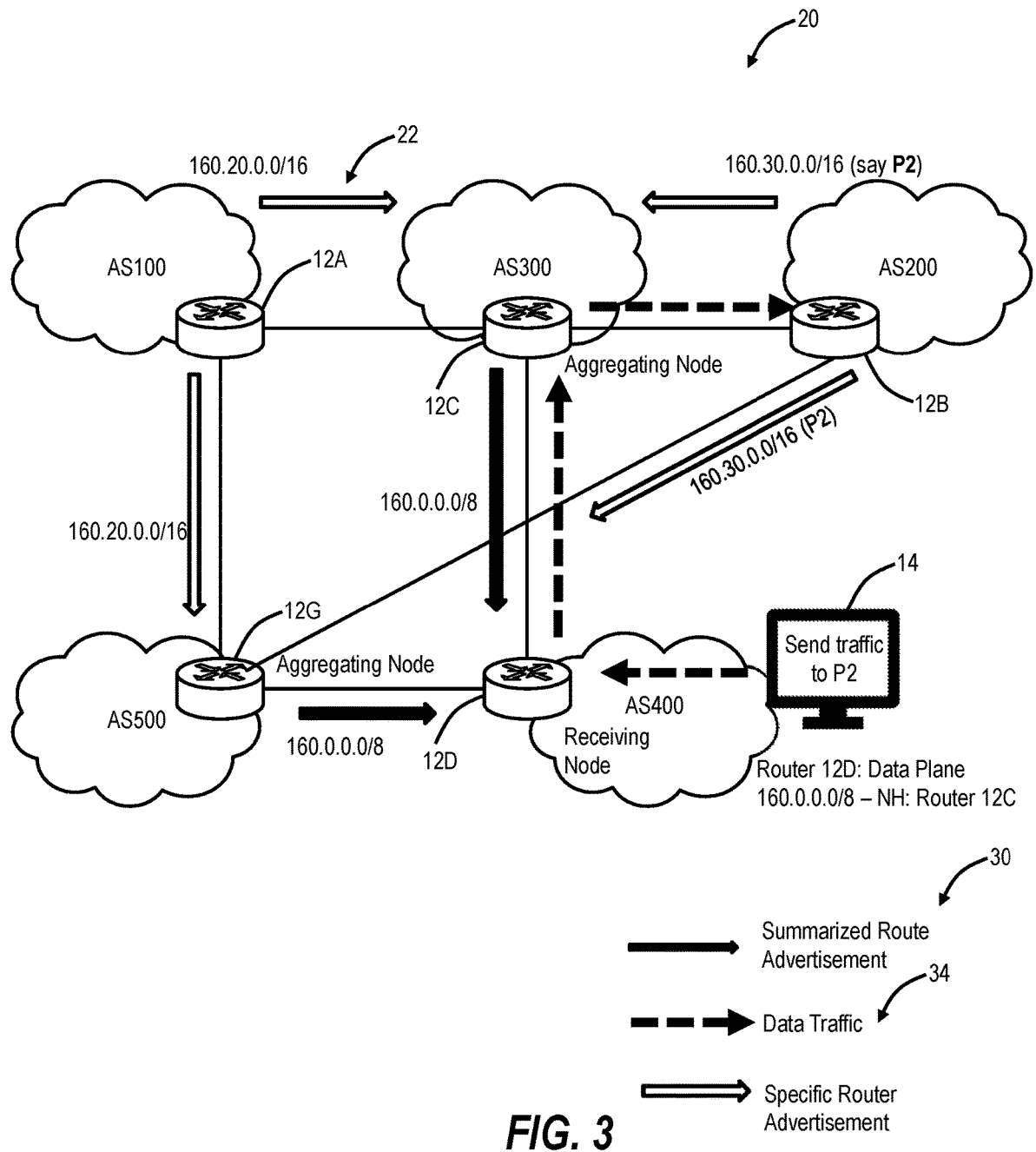
FIGS. 3, 4, and 5 are network diagrams of a network illustrating external BGP (eBGP) traffic blackholing and sub-optimal routing.
Figure 4:
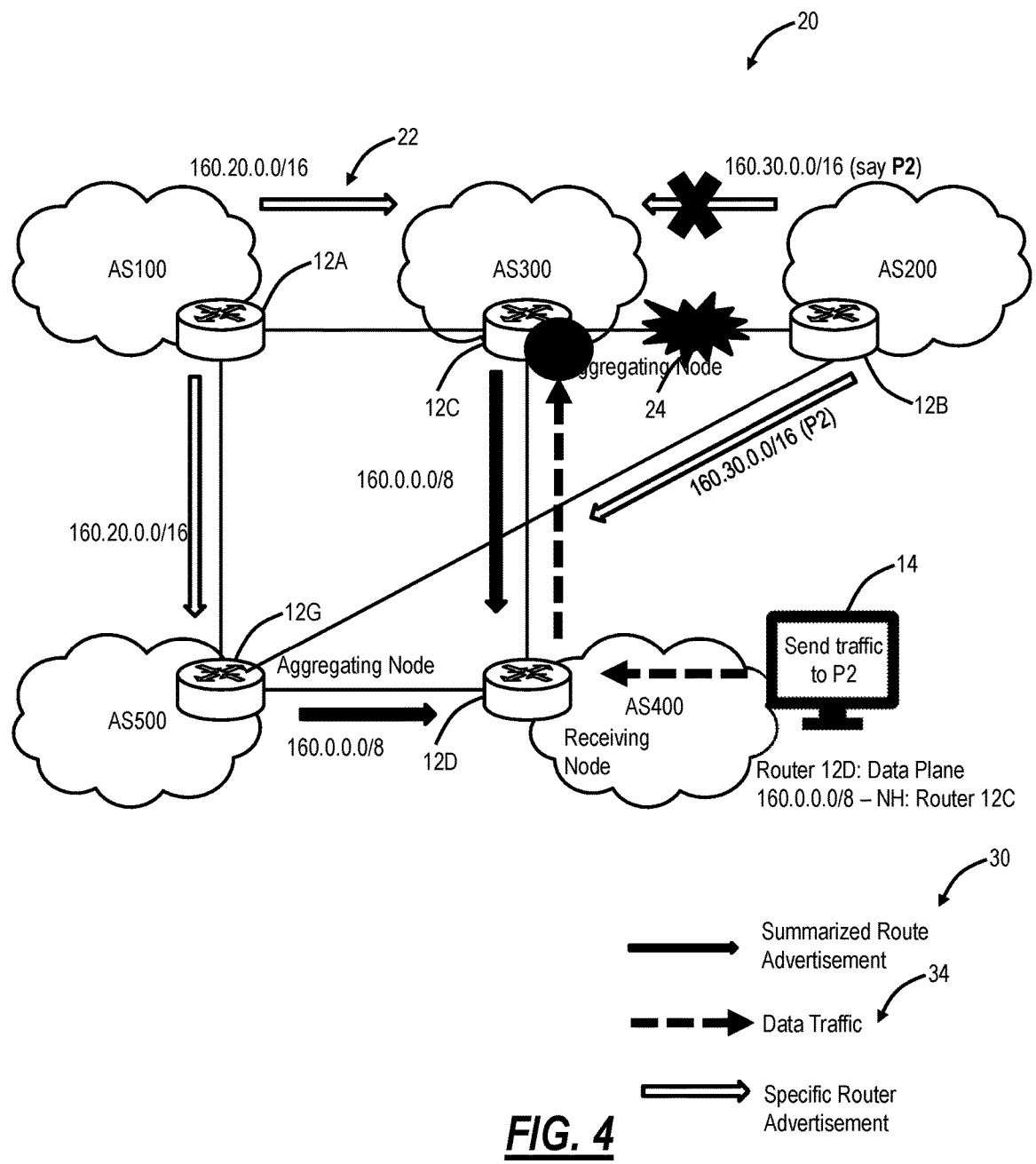
Figure 5:
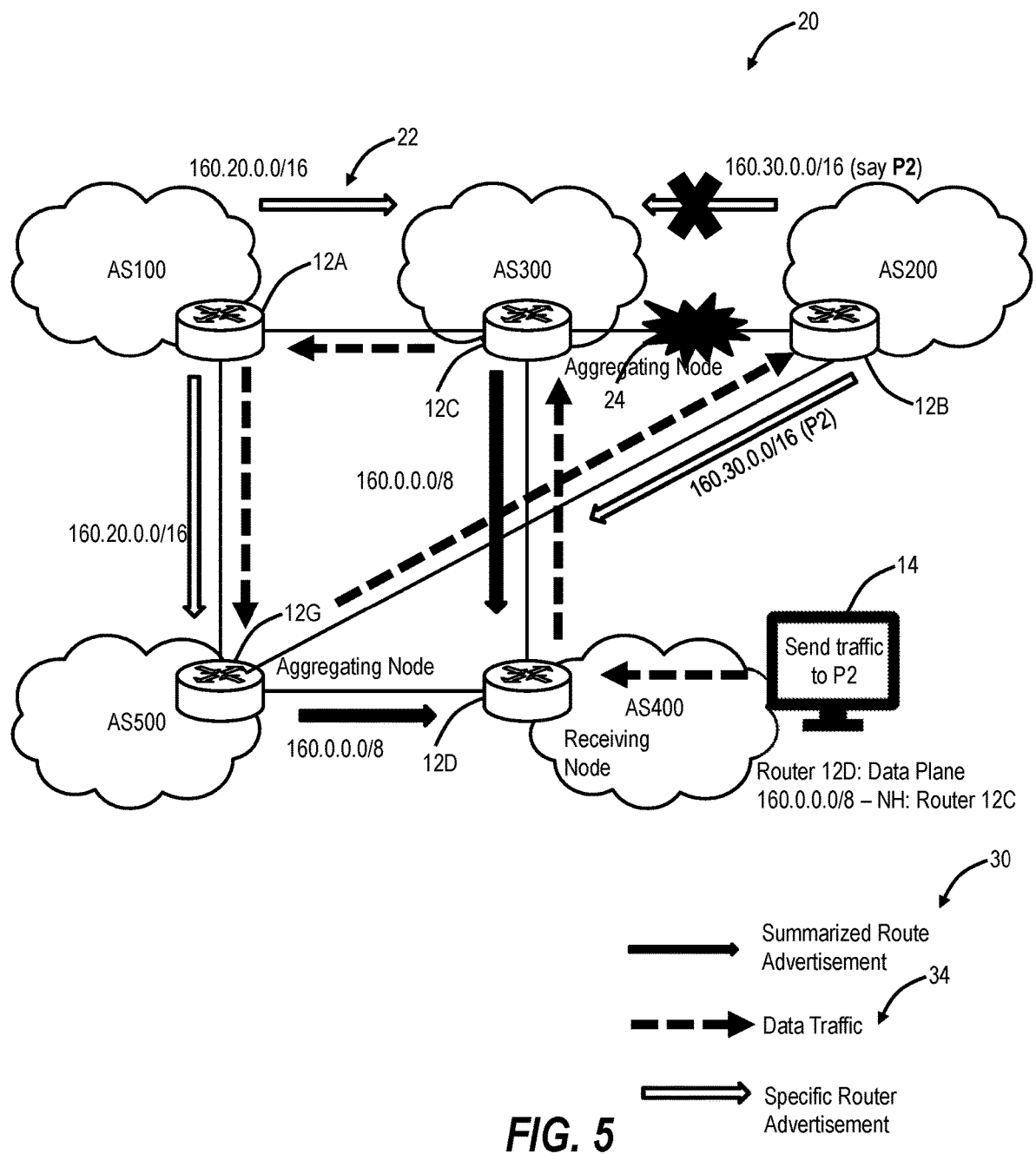

FIGS. 3, 4, and 5 are network diagrams of a network 20 illustrating external BGP (eBGP) traffic blackholing. In this example, there are five example autonomous systems AS100, AS200, AS300, AS400, AS500 and example routers 12A, 12B, 12C, 12D, 12G are illustrated in each one of the autonomous systems AS100, AS200, AS300, AS400, AS500, respectively. Again, the network 20 utilizes BGP route aggregation where advertisements 22 are shown for aggregated prefixes within each autonomous system AS100, AS200, AS300, AS200, AS400, AS500. In these examples, the device 14 is configured to send traffic to prefix P2 which is in the autonomous system AS200, and the router 12D in the autonomous system AS400 is configured to send the traffic destined to the prefix P2 via an NH to the router 12C.

There is a fault 24 which causes the traffic from the device 14 to be blackholed at the router 12C since there is no route to the router 12B from the router 12C. Similar to FIG. 4, there is the fault 24 between the routers 12B, 12C. Here, the router 12C has a default route and traffic is now sub-optimally routed, as shown in FIG. 5.

BGP Aggregation Exception Path Attribute

In order to mitigate the problems of sub-optimal routing and traffic blackholing, the present disclosure includes a new path attribute that is referred to herein as a "BGP Aggregate-Exception." Of course, other names can be given to this path attribute and are contemplated herewith. The aggregating BGP speaker encodes this attribute and the failed network in a BGP update to advertise to its peers about the network failures. Upon receiving the message, the peers look for the alternative next-hop in a BGP routing database and install the new route in the data plane in order to redirect the traffic. This approach makes use of the longest-prefix matching forwarding lookup idea and installs the longer prefix in the data plane in order to redirect traffic to a more specific route.

Figure 6:
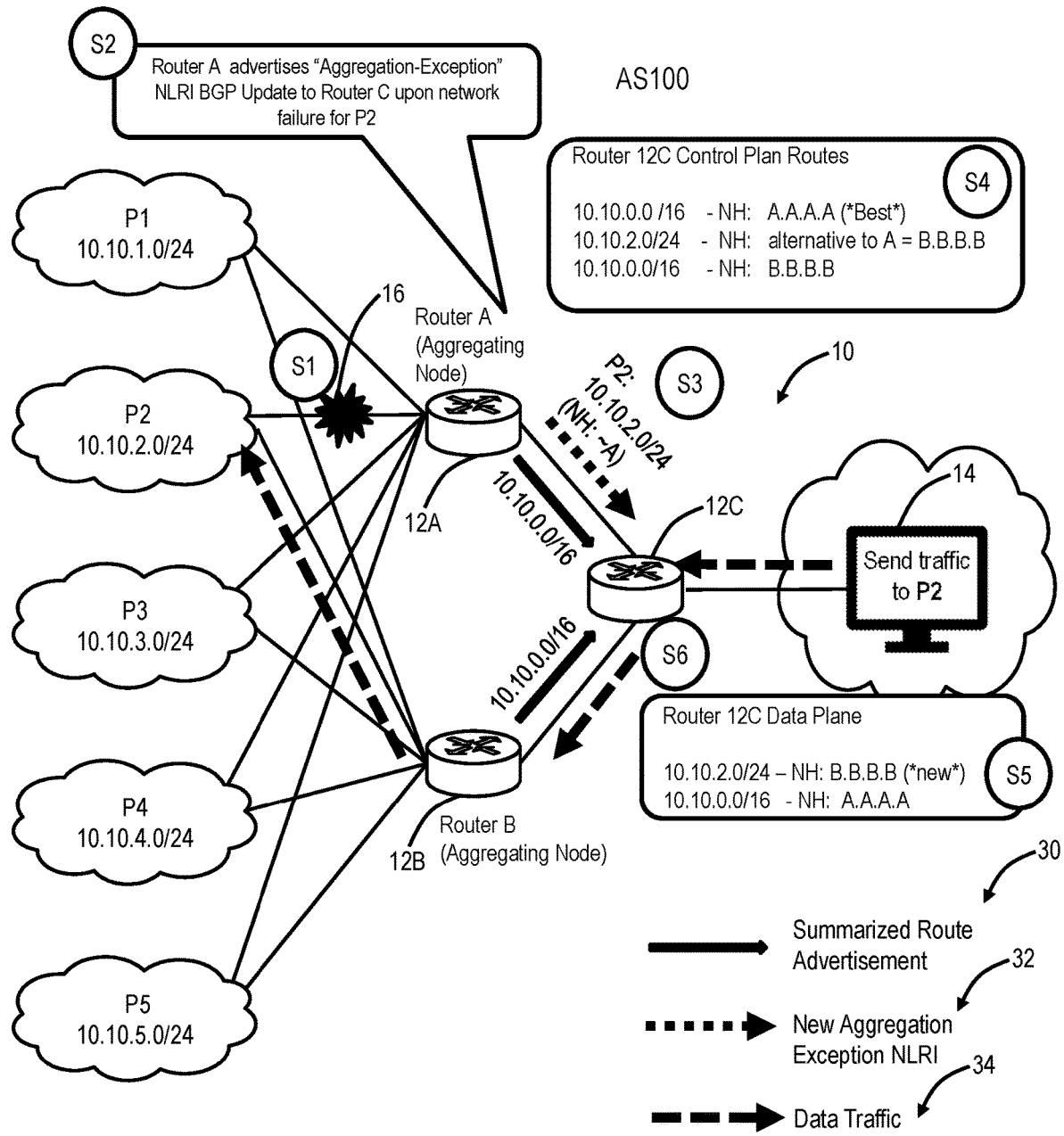
FIG. 6 is a network diagram of the network of FIG. 1 illustrating an aggregation exception with a network failure for a specific route which is part of aggregation in iBGP.

FIG. 6 is a network diagram of the network 10 illustrating an aggregation exception with a network failure for a specific route, which is part of aggregation in iBGP. This is the same as in FIG. 2 except there is a BGP aggregation exception that is advertised. Specifically, various steps S1-S6 are described in FIG. 6 with the aggregating router 12A performing the steps S1-S2 and the receiving router 12C performing the steps S3-S6. Also, flows 30, 32, 34 with arrows are used to show summarized route advertisements 30, the new aggregation exception NLRI 32, and the data traffic 34.

First, at step S1, upon detecting the fault 16, the aggregating router 12A has to determine that it advertised the summarized prefix on behalf of the specific fault 16. At step S2, if there is an advertised summarized prefix associated with the fault, the aggregating router 12A has to encode a new path attribute (37) in the BGP update and advertises a failed prefix NLRI in the BGP update message to its peers. For example, this failed prefix in this case is 10.10.2.0/24, and there is a notation such as NH: ~A to note the failure at the aggregating node 12A. Also, this new path attribute can use an unassigned value for the path attribute, such as, for example, New path attribute: AGGREGATE_EXCEPTION using Unassigned value—37 or any other unique value.

For the receiving router 12C, at step S3, on receiving the BGP update with the "Aggregation-Exception" NLRI therein, the receiving router 12C understands the message that the network had failed on the aggregating router 12A to the prefix P2 (10.10.2.0/24). At step S4, the receiving router 12C looks into the BGP routing table to find the alternative path to the failed network other than the BGP aggregation router 12A, which advertised the failure. In this example, for the prefix P2, there is an alternative NH to A via the router 12B (address B.B.B.B). At step S5, the router 12C programs the data plane for the failed network prefix with the new next-hop. Finally, at step S6, data traffic for the prefix gets forwarded to alternative next-hop.

Figure 7:
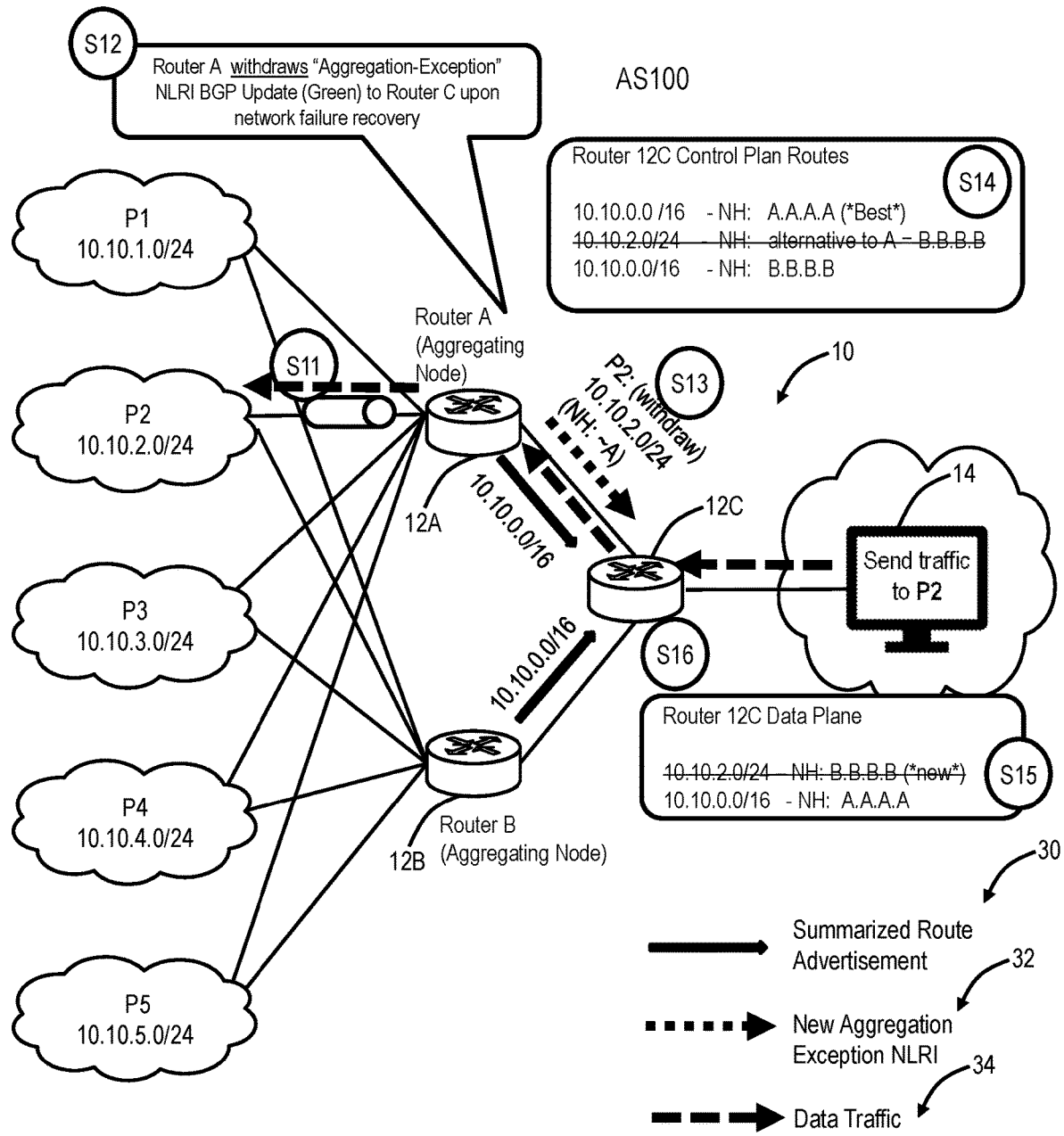
FIG. 7 is a network diagram of the network illustrating an aggregation exception withdrawal for a network recovery after the fault in FIG. 6.

FIG. 7 is a network diagram of the network 10 illustrating an aggregation exception with a network recovery after the fault 16 in FIG. 6. Once the network fault 16 in FIG. 6 recovers, the aggregating router 12A withdraws the "Aggre-gation-Exception NLRI" that had earlier been advertised. The receiving router 12C deletes the "Aggregation Exception route" from the control plane and data plane, and the traffic falls back to the original path. Specifically, various steps S11-S16 are described in FIG. 7 with the aggregating router 12A performing the steps S11-S12 and the receiving router 12C performing the steps S13-S16.

At step S11, the aggregating router 12A detects the recovery of the previously available route to the prefix P2. At step S12, the aggregating router 12A withdraws the previously advertised "Aggregation-Exception" NLRI from the peers, e.g., P2: (withdraw) 10.10.2.0/24 (NH: ~A). At step S13, the receiving router 12C, on receiving the route withdrawal for "Aggregation-Exception" NLRI, understands the message that the network has been recovered on the aggregating router 12A. At step S14, the receiving router 12C removes the aggregation exception NLRI route from the BGP routing table. At step S15, the receiving router 12C uninstalls the data plane entry for the prefix (previously failed). Finally, at step S16, the data traffic gets forwarded back to the aggregating router 12A as the next-hop.

Figure 8:
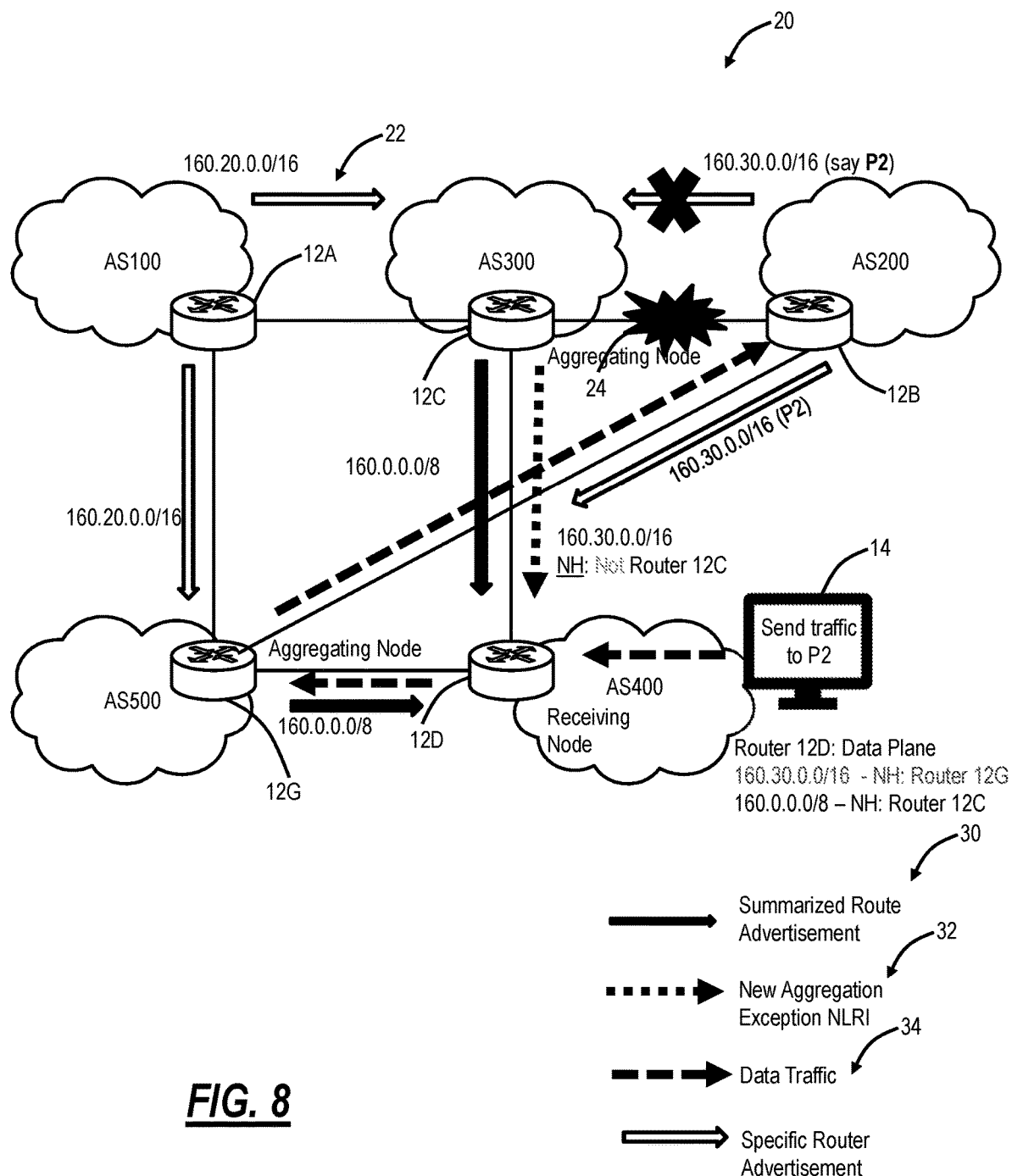
FIG. 8 is a network diagram of the network illustrating an aggregation exception with a network failure for a specific route, which is part of aggregation in eBGP.
Figure 9:
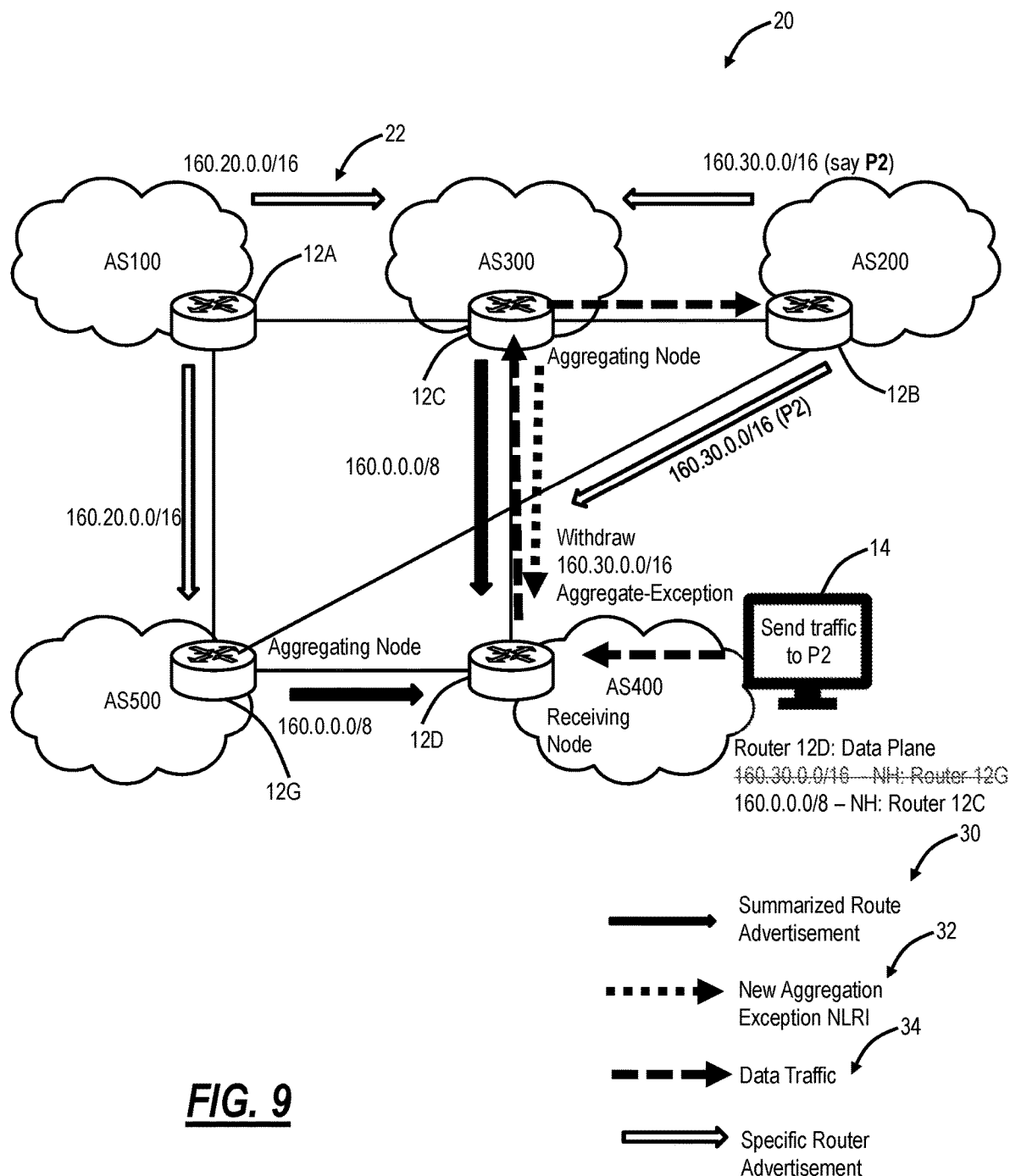
FIG. 9 is a network diagram of the network illustrating an aggregation exception withdrawal for a network recovery after the fault in FIG. 8.

FIG. 8 is a network diagram of the network 20 illustrating an aggregation exception with a network failure for a specific route, which is part of aggregation in eBGP. Also, this shows the same fault 24 as in FIGS. 4-5. FIG. 9 is a network diagram of the network 20 illustrating an aggregation exception with a failed network after the fault 24 in FIG. 8. In FIG. 8, after detecting the fault 24, the router 12C sends a BGP update with an "Aggregation-Exception" NLRI therein, namely 160.30.0.0/16, NH: Not Router 12C. The router 12D receives this NLRI and installs an alternate NH for this prefix in the data plane. In FIG. 9, the router 12D detects the fault 24 has cleared and sends a route withdrawal for "Aggregation-Exception" NLRI, namely Withdraw 160.30.0.0/16 Aggregate-Exception. Once withdrawal is processed, the traffic falls back to original path as before.

This solution could be further fine-tuned using Command Line Interfaces (CLIs) with global and neighbor level to control the advertisement of the "Aggregation-Exception" BGP updates. For example, a new CLI command can be introduced to switch on/off the behavior—per neighbor/global level, such as bgp aggregate-exception enable bgp neighbor aggregate-exception enable This can also be applicable to other address families—IPv4 Unicast, IPv4 Labeled-Unicast, VPN-IPv4, etc. The present disclosure mitigates the blackholing and sub-optimal routing. Also, this approach is agnostic to iBGP or eBGP and can be used in both intra-AS and inter-AS scenarios, i.e., wherever BGP summarization is being deployed.

Flowcharts

There are two parts to the present disclosure, namely functionality at the aggregating node and at the receiving node. Of note, third-party routers can be aggregating nodes or receiving nodes. For full implementation, both would need to be configured, and this could be implemented proprietary or via standards, e.g., RFCs.

Figure 10:
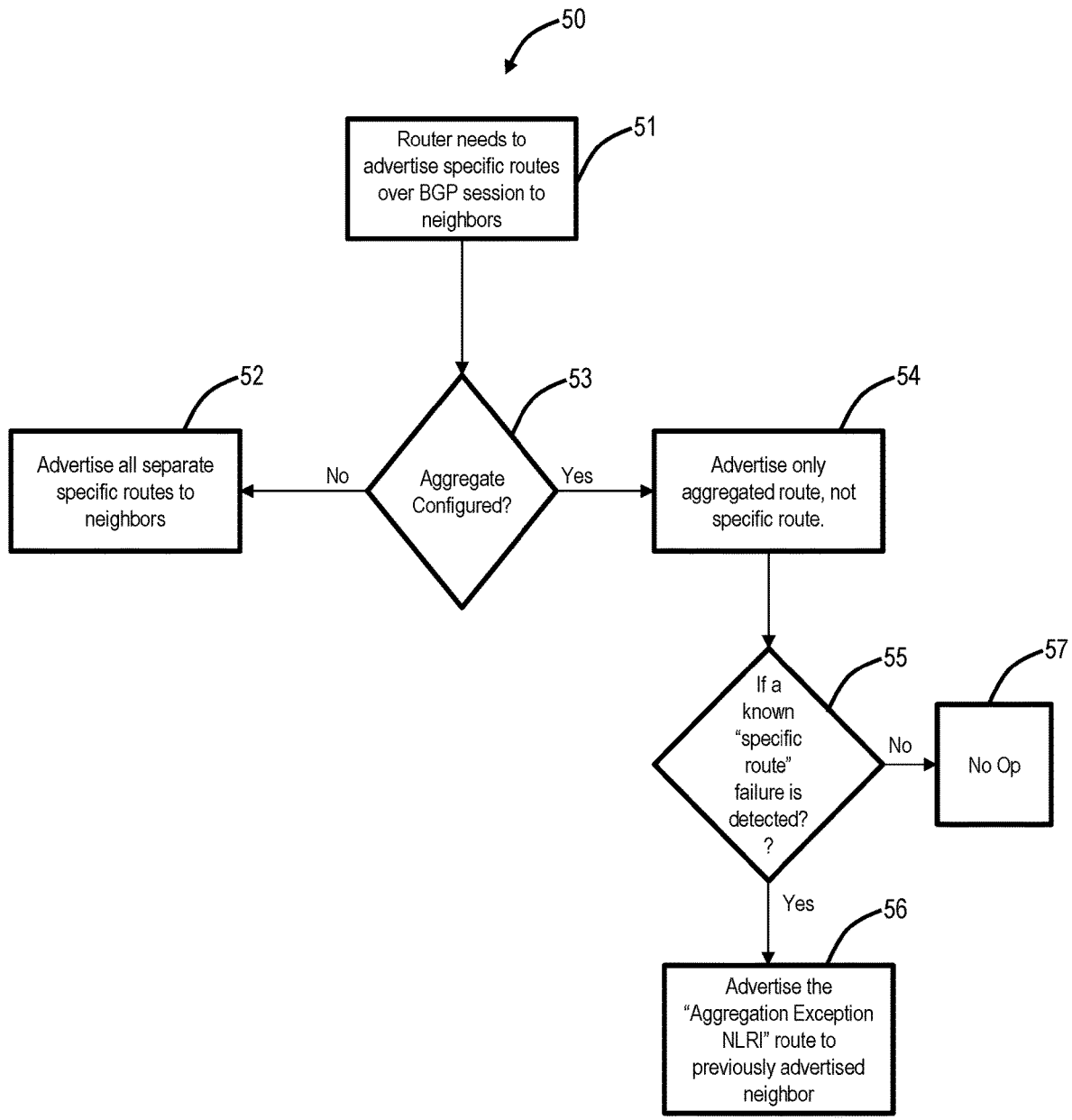
FIG. 10 is a flowchart of a process for functionality at an aggregating node during a network failure.

FIG. 10 is a flowchart of a process 50 for functionality at an aggregating node during a network failure. The process 50 includes having the router advertise specific routes over a BGP session to neighbors (steps 51-52). Route aggregation can be configured (step 53). With route aggregation, the router advertises only aggregated routes, not specific routes (step 54). If the aggregating node detects a specific route failure affecting one or more aggregated routes (step 55), the aggregating node advertises the "Aggregation Exception NLRI" route to previously advertised neighbors (step 56).

Of note, the failure or fault must affect less than all of the aggregated routes and the Aggregation Exception NLRI includes identification of the affected aggregated routes. If there is no fault (step 55), no operation is performed (step 57).

Figure 11:
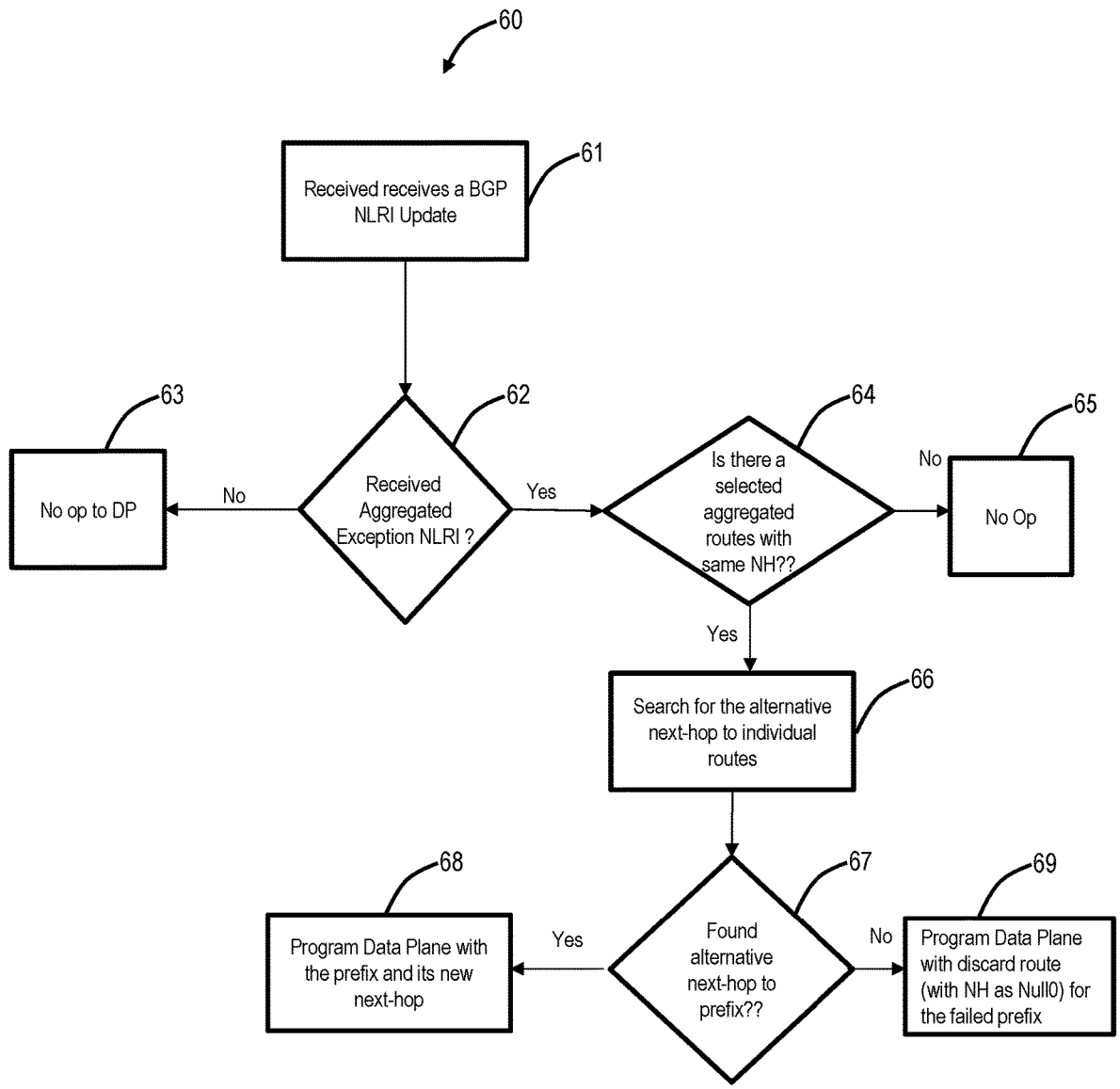
FIG. 11 is a flowchart of a process for functionality at a receiving node during a network failure.

FIG. 11 is a flowchart of a process 60 for functionality at a receiving node during a network failure. The receiving node receives BGP NLRI updates (step 61). If there is no received aggregated exception NLRI (step 62), there is no operation to the data plane (step 63), and any BGP NLRI update is processed as normal. If the BGP NLRI update includes an aggregated exception NLRI (step 63), the receiving node checks if there are any selected aggregated routes with the same NH (step 64). If not, there is no operation (step 65). If so, the receiving node searches for alternative NH to individual routes (step 66). If there are alternative NH to the prefixes (step 67), the receiving node programs the data plane with the prefix and its new NH (step 68). Otherwise, there is no operation (step 69). Here, the data plane can be programmed to discard such as with a NH as null0 for the failed prefix, causing a local discard.

Figure 12:
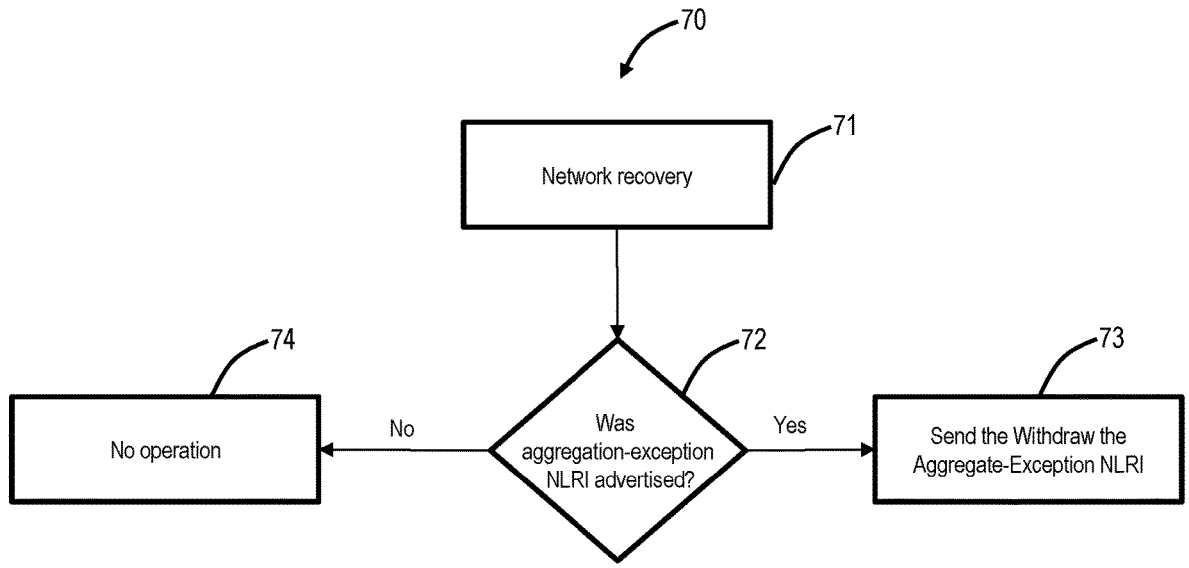
FIG. 12 is a flowchart of a process for functionality at the aggregating node during network recovery.

FIG. 12 is a flowchart of a process 70 for functionality at the aggregating node during network recovery. After a network recovery (step 71), when there was an aggregation exception NLRI advertised (step 72), the aggregating node sends a withdrawal of the aggregation exception NLRI (step 73). Otherwise, there is no operation (step 74).

Figure 13:
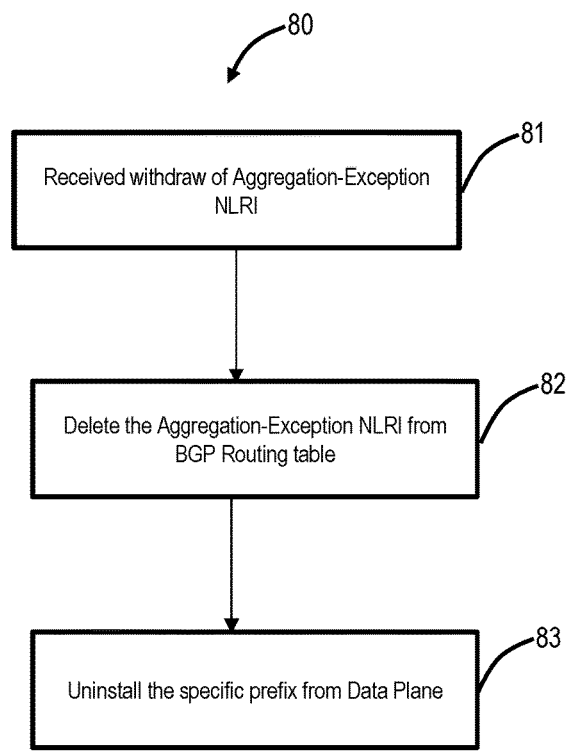
FIG. 13 is a flowchart of a process for functionality at the receiving node during network recovery.

FIG. 13 is a flowchart of a process 80 for functionality at the receiving node during network recovery. The receiving node receives the withdrawal of the aggregation exception NLRI (step 81). The receiving node deletes the aggregation exception NLRI from the BGP routing table (step 82), and uninstalls the specific prefix from the data plane (step 83).

Figure 14:
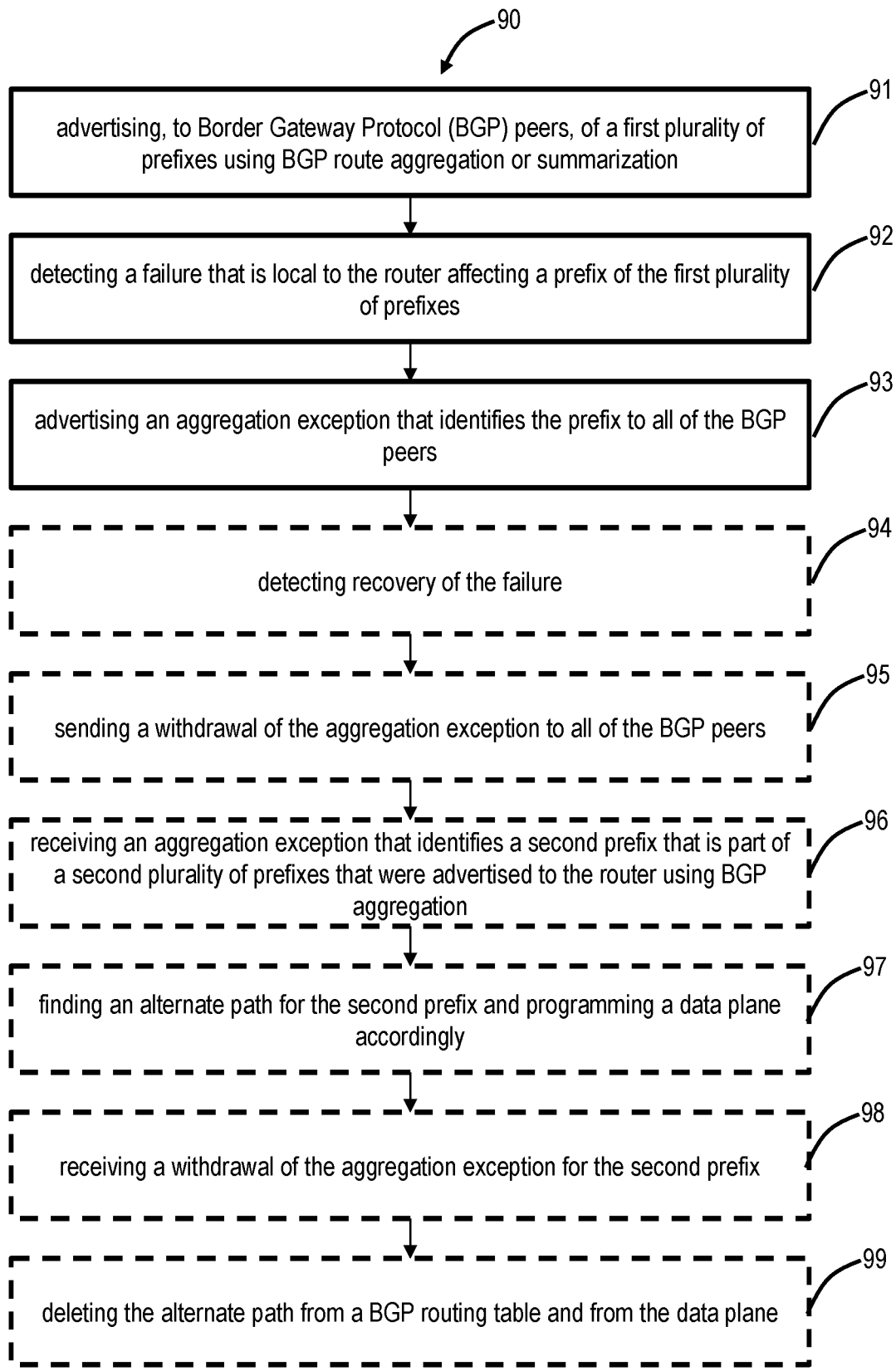
FIG. 14 is a flowchart of a process for the BGP route aggregation exception.

FIG. 14 is a flowchart of a process 90 for BGP route aggregation exception. The process 90 is described with reference to one of the routers 12. The process 90 can be implemented as a method that includes steps, via a router configured to execute the steps, and via a non-transitory computer-readable medium that includes instructions that cause one or more processors to implement the steps.

The process 90 includes advertising, to Border Gateway Protocol (BGP) peers, of a first plurality of prefixes using BGP route aggregation or summarization (step 91); detecting a failure that is local to the router affecting a prefix of the first plurality of prefixes (step 92); and advertising an aggregation exception that identifies the prefix to all of the BGP peers (step 93). The process 90 can further include detecting recovery of the failure (step 94); and sending a withdrawal of the aggregation exception to all of the BGP peers (step 95).

The process 90 can further include receiving an aggregation exception that identifies a second prefix that is part of a second plurality of prefixes that were advertised to the router using BGP aggregation (step 96); and finding an alternate path for the second prefix and programming a data plane accordingly (step 97). The process 90 can further include receiving a withdrawal of the aggregation exception for the second prefix (step 98); and deleting the alternate path from a BGP routing table and from the data plane (step 99). The aggregation exception can be a path attribute in a BGP update message.

Example Router

Figure 15:
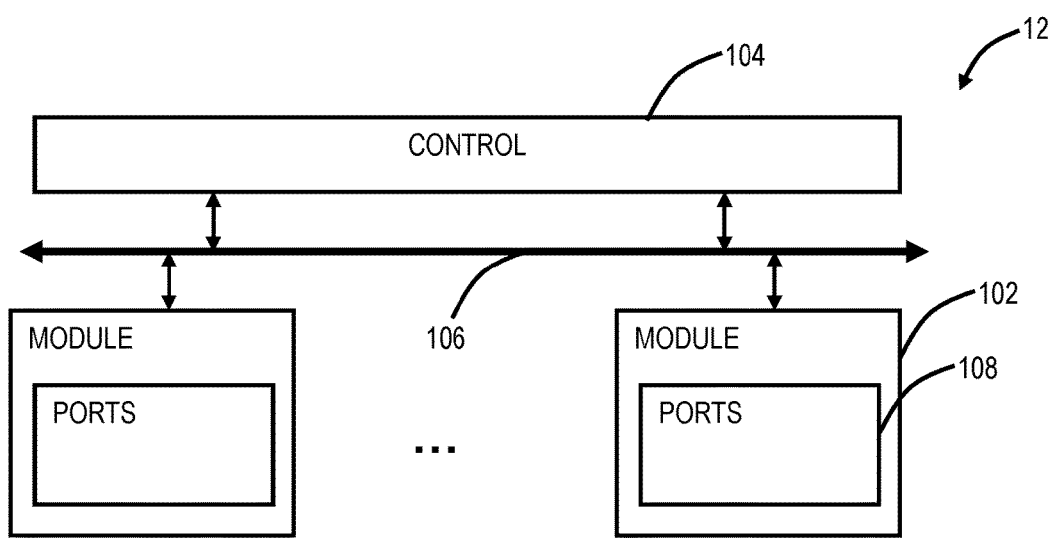
FIG. 15 is a block diagram of an example implementation of a router.

FIG. 15 is a block diagram of an example implementation of a router 12. Those of ordinary skill in the art will recognize FIG. 15 is a functional diagram in an oversimplified manner, and a practical embodiment may include additional components and suitably configured processing logic to support known or conventional operating features that are not described in detail herein.

In an embodiment, the router 12 is a packet switch, but those of ordinary skill in the art will recognize the systems and methods described herein can operate with other types of network elements and other implementations that support BGP aggregation. In this embodiment, the router 12 includes a plurality of modules 102, 104 interconnected via an interface 106. The modules 102, 104 are also known as blades, line cards, line modules, circuit packs, pluggable modules, etc. and generally refer to components mounted on a chassis, shelf, etc. of a data switching device, i.e., the router 12. Each of the modules 102, 104 can include numerous electronic devices and/or optical devices mounted on a circuit board along with various interconnects, including interfaces to the chassis, shelf, etc.

Two example modules are illustrated with line modules 102 and a control module 104. The line modules 102 include ports 108, such as a plurality of Ethernet ports. For example, the line module 102 can include a plurality of physical ports disposed on an exterior of the module 102 for receiving ingress/egress connections. Additionally, the line modules 102 can include switching components to form a switching fabric via the interface 106 between all of the ports 108, allowing data traffic to be switched/forwarded between the ports 108 on the various line modules 102. The switching fabric is a combination of hardware, software, firmware, etc. that moves data coming into the router 12 out by the correct port 108 to the next router 12. "Switching fabric" includes switching units in a node; integrated circuits contained in the switching units; and programming that allows switching paths to be controlled. Note, the switching fabric can be distributed on the modules 102, 104, in a separate module (not shown), integrated on the line module 102, or a combination thereof.

The control module 104 can include a microprocessor, memory, software, and a network interface. Specifically, the microprocessor, the memory, and the software can collectively control, configure, provision, monitor, etc. the router 12. The network interface may be utilized to communicate with an element manager, a network management system, etc. Additionally, the control module 104 can include a database that tracks and maintains provisioning, configuration, operational data, and the like.

Again, those of ordinary skill in the art will recognize the router 12 can include other components which are omitted for illustration purposes, and that the systems and methods described herein are contemplated for use with a plurality of different network elements with the router 12 presented as an example type of network element. For example, in another embodiment, the router 12 may include corresponding functionality in a distributed fashion. In a further embodiment, the chassis and modules may be a single integrated unit, namely a rack-mounted shelf where the functionality of the modules 102, 104 is built-in, i.e., a "pizza-box" configuration. That is, FIG. 15 is meant to provide a functional view, and those of ordinary skill in the art will recognize actual hardware implementations may vary.

Example Controller

Figure 16:
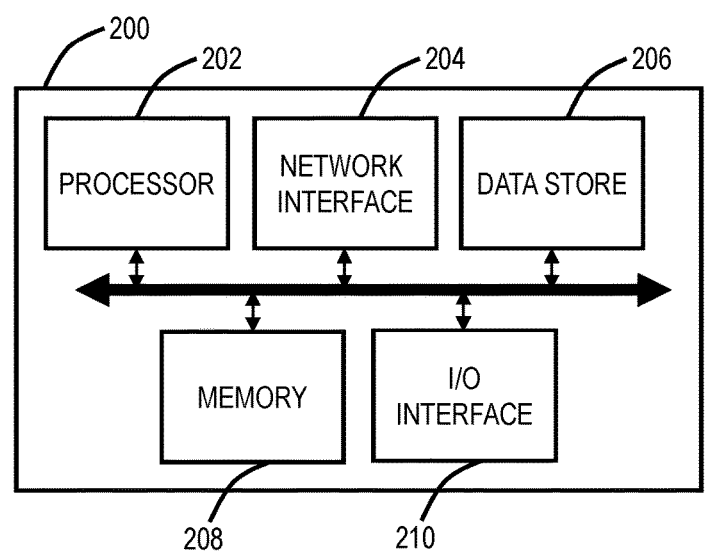
FIG. 16 is a block diagram of an example controller, which can form a controller for the router.

FIG. 16 is a block diagram of an example controller 200, which can form a controller for the router 12. The controller 200 can be part of the router 12 or a stand-alone device communicatively coupled to the router 12. Also, the controller 200 can be referred to in implementations as a control module, a shelf controller, a shelf processor, a system controller, etc. The controller 200 can include a processor 202, which is a hardware device for executing software instructions. The processor 202 can be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory, to communicate data to and from the memory, and to generally control operations of the controller 200 pursuant to the software instructions. The controller 200 can also include a network interface 204, a data store 206, memory 208, an I/O interface 210, and the like, all of which are communicatively coupled to one another and to the processor 202.

The network interface 204 can be used to enable the controller 200 to communicate on a data communication network, such as to communicate to a management system, to the nodes 12, 100, and the like. The network interface 204 can include, for example, an Ethernet module. The network interface 204 can include address, control, and/or data connections to enable appropriate communications on the network. The data store 206 can store data, such as control plane information, provisioning data, Operations, Administration, Maintenance, and Provisioning (OAM&P) data, etc. The data store 206 can include any of volatile memory elements (e.g., random access memory (RAM, such as DRAM, SRAM, SDRAM, and the like)), nonvolatile memory elements (e.g., ROM, hard drive, flash drive, CDROM, and the like), and combinations thereof. Moreover, the data store 206 can incorporate electronic, magnetic, optical, and/or other types of storage media. The memory 208 can include any of volatile memory elements (e.g., random access memory (RAM, such as DRAM, SRAM, SDRAM, etc.)), nonvolatile memory elements (e.g., ROM, hard drive, flash drive, CDROM, etc.), and combinations thereof. Moreover, the memory 208 may incorporate electronic, magnetic, optical, and/or other types of storage media. Note that the memory 208 can have a distributed architecture, where various components are situated remotely from one another, but may be accessed by the processor 202. The I/O interface 210 includes components for the controller 200 to communicate with other devices.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A router comprising:
a plurality of ports and switching circuitry configured to switch traffic between the plurality of ports; and
circuitry configured to
cause an advertisement, to Border Gateway Protocol (BGP) peers, of a first plurality of prefixes using BGP route aggregation or summarization that replaces a number of individual network advertisements of the first plurality of prefixes with a single summarized advertisement of a summarized prefix for all of the first plurality of prefixes,
detect a failure that is local to the router affecting a prefix of the first plurality of prefixes, and
cause an advertisement of an aggregation exception that identifies the prefix to all of the BGP peers and is used to withdraw the prefix from the summarized prefix and do not withdraw the summarized prefix.

2. The router of claim 1, wherein the circuitry is further configured to
detect recovery of the failure, and
cause a withdrawal of the aggregation exception to all of the BGP peers.

3. The router of claim 1, wherein the circuitry is further configured to
receive an aggregation exception that identifies a second prefix that is part of a second plurality of prefixes that were advertised to the router using BGP aggregation, and
find an alternate path for the second prefix and program a data plane accordingly.

4. The router of claim 3, wherein the circuitry is further configured to receive a withdrawal of the aggregation exception for the second prefix, and delete the alternate path from a BGP routing table and from the data plane.

5. The router of claim 1, wherein the aggregation exception is a path attribute in a BGP update message.

6. The router of claim 1, wherein the BGP includes one of internal BGP (iBGP) and external BGP (eBGP).

7. The router of claim 1, wherein the aggregation exception is a route-advertisement of path-avoidance to a specific next-hop.

8. A method implemented by a router comprising:

advertising, to Border Gateway Protocol (BGP) peers, a first plurality of prefixes using BGP route aggregation or summarization that replaces a number of individual network advertisements of the first plurality of prefixes with a single summarized advertisement of a summarized prefix for all of the first plurality of prefixes;

detecting a failure that is local to the router affecting a prefix of the first plurality of prefixes; and advertising an aggregation exception that identifies the prefix to all of the BGP peers and is used to withdraw the prefix from the summarized prefix and do not withdraw the summarized prefix.

9. The method of claim 8, further comprising detecting recovery of the failure; and sending a withdrawal of the aggregation exception to all of the BGP peers.

10. The method of claim 8, further comprising receiving an aggregation exception that identifies a second prefix that is part of a second plurality of prefixes that were advertised to the router using BGP aggregation; and finding an alternate path for the second prefix and programming a data plane accordingly.

11. The method of claim 10, further comprising receiving a withdrawal of the aggregation exception for the second prefix; and deleting the alternate path from a BGP routing table and from the data plane.

12. The method of claim 8, wherein the aggregation exception is a path attribute in a BGP update message.

13. The method of claim 8, wherein the BGP includes one of internal BGP (iBGP) and external BGP (eBGP).

14. The method of claim 8, wherein the aggregation exception is a route-advertisement of path-avoidance to a specific next-hop.

15. A non-transitory computer-readable medium comprising instructions that, when executed, cause one or more processors to perform steps of:

advertising, to Border Gateway Protocol (BGP) peers, a first plurality of prefixes using BGP route aggregation or summarization that replaces a number of individual network advertisements of the first plurality of prefixes with a single summarized advertisement of a summarized prefix for all of the first plurality of prefixes;

detecting a failure that is local to the router affecting a prefix of the first plurality of prefixes; and advertising an aggregation exception that identifies the prefix to all of the BGP peers and is used to withdraw the prefix from the summarized prefix and do not withdraw the summarized prefix.

16. The non-transitory computer-readable medium of claim 15, wherein the steps further include detecting recovery of the failure; and sending a withdrawal of the aggregation exception to all of the BGP peers.

17. The non-transitory computer-readable medium of claim 15, wherein the steps further include receiving an aggregation exception that identifies a second prefix that is part of a second plurality of prefixes that were advertised to the router using BGP aggregation;

finding an alternate path for the second prefix and programming a data plane accordingly.

18. The non-transitory computer-readable medium of claim 17, wherein the steps further include receiving a withdrawal of the aggregation exception for the second prefix; and deleting the alternate path from a BGP routing table and from the data plane.

19. The non-transitory computer-readable medium of claim 15, wherein the aggregation exception is a path attribute in a BGP update message.

20. The non-transitory computer-readable medium of claim 15, wherein, responsive to a failure of all of the first plurality of prefixes, the steps further include withdrawing the summarized prefix.

\* \* \* \* \*